(12) United States Patent
     Tanaka

(10) Patent No.: US 9,065,939 B2
(45) Date of Patent: Jun. 23, 2015

(54) PRINTING MANAGEMENT SYSTEM USING CORRESPONDENCE BETWEEN USER IDENTIFICATION INFORMATION OF AN INFORMATION SYSTEM AND USER IDENTIFICATION INFORMATION OF A PRINTING SYSTEM

(75) Inventor: Hironori Tanaka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 344 days.

(21) Appl. No.: 13/601,633

(22) Filed: Aug. 31, 2012

(65) Prior Publication Data

US 2013/0235418 A1    Sep. 12, 2013

(30) Foreign Application Priority Data

Mar. 7, 2012 (JP) ................................. 2012-051006

(51) Int. Cl.
| | |
|---|---|
| G06F 15/00 | (2006.01) |
| G06F 3/12 | (2006.01) |
| G06K 1/00 | (2006.01) |
| H04N 1/00 | (2006.01) |
| H04L 29/06 | (2006.01) |
| H04W 12/06 | (2009.01) |

(52) U.S. Cl.
CPC ......... *H04N 1/00228* (2013.01); *H04N 1/0023* (2013.01); *H04N 1/00233* (2013.01); *H04N 1/00307* (2013.01); *H04N 1/00344* (2013.01); *G06F 3/1222* (2013.01); *G06F 3/1238* (2013.01); *G06F 3/1267* (2013.01); *G06F 3/1287* (2013.01); *G06F 3/1288* (2013.01); *H04L 63/08* (2013.01); *H04L 63/18* (2013.01); *H04W 12/06* (2013.01); *H04N 2201/0082* (2013.01); *G06F 3/1204* (2013.01)

(58) Field of Classification Search
CPC .................... H04N 1/4413; H04N 2201/3205; G06F 21/604; G06F 21/31; G06F 21/32; G06F 21/34
USPC .................................. 358/1.1, 1.15; 258/1.14
See application file for complete search history.

(56) References Cited

U.S. PATENT DOCUMENTS

| | | | |
|---|---|---|---|
| 8,104,084 B2* | 1/2012 | Smithson | 726/19 |
| 2003/0115322 A1* | 6/2003 | Moriconi et al. | 709/224 |
| 2005/0204145 A1* | 9/2005 | Makishima | 713/182 |
| 2006/0075230 A1* | 4/2006 | Baird et al. | 713/168 |
| 2007/0101415 A1* | 5/2007 | Masui | 726/5 |
| 2008/0005579 A1* | 1/2008 | Gaines et al. | 713/186 |
| 2008/0204798 A1* | 8/2008 | Taniguchi et al. | 358/1.15 |
| 2009/0237715 A1* | 9/2009 | Kasatani | 358/1.15 |
| 2010/0179894 A1* | 7/2010 | Cacheria et al. | 705/32 |
| 2012/0307286 A1* | 12/2012 | Osaki | 358/1.14 |

FOREIGN PATENT DOCUMENTS

| | | |
|---|---|---|
| JP | 11-123859 A | 5/1999 |
| JP | 2007-148803 A | 6/2007 |
| JP | 2009-093406 A | 4/2009 |

OTHER PUBLICATIONS

English translation of Japanese Office Action issued Jan. 29, 2013 in Japanese Patent Application No. 2012-051006.

* cited by examiner

*Primary Examiner* — Douglas Tran
(74) *Attorney, Agent, or Firm* — Sughrue Mion, PLLC

(57) ABSTRACT

A printing system includes at least one image forming apparatus and a management apparatus, each of the image forming apparatus and the management apparatus connected to an information system. The management system includes a receiving unit, an association relationship registration unit, and a user setting unit. The image forming apparatus includes a print data retrieval unit, a converter unit, and a control unit.

10 Claims, 9 Drawing Sheets

FIG. 3

| LOGICAL PRINTER ID | USER CLOUD ID | IN-HOUSE ID |
|---|---|---|
| Printer-A | tanaka@cloudprint.com | fx1234 |
|  | suzuki@cloudprint.com | fx9999 |
| Printer-B | tanaka@cloudprint.com | fx1234 |

FIG. 4

| LOGICAL PRINTER ID | USER CLOUD ID |
|---|---|
| Printer-A | tanaka@cloudprint.com |
|  | suzuki@cloudprint.com |
| Printer-B | tanaka@cloudprint.com |

FIG. 5

| USER CLOUD ID | IN-HOUSE ID |
|---|---|
| tanaka@cloudprint.com | fx1234 |
| suzuki@cloudprint.com | fx9999 |
| tanaka@cloudprint.com | fx1234 |

FIG. 7

| LOGICAL PRINTER ID | USER CLOUD ID | IN-HOUSE ID |
|---|---|---|
| Printer-A | tanaka@cloudprint.com | fx1234 |
| | suzuki@cloudprint.com | fx9999 |
| | sato@cloudprint.com | fx2345 |
| Printer-B | tanaka@cloudprint.com | fx1234 |

FIG. 10

| USER CLOUD ID | IN-HOUSE USER ID |
|---|---|
| tanaka@cloudprint.com | fx1234 |
| suzuki@cloudprint.com | fx9999 |
| Any | fx9999 |

FIG. 11

| USER CLOUD ID | IN-HOUSE USER ID |
|---|---|
| tanaka@cloudprint.com | fx1234 |
| suzuki@cloudprint.com | fx9999 |
| Any | Unknown |

FIG. 12

| USER CLOUD ID | SERVICE NAME | IN-HOUSE USER ID |
|---|---|---|
| tanaka@cloudprint.com | CloudPrint | fx1234 |
| suzuki@cloudprint.com | CloudPrint | fx9999 |
| tanaka@printservice.com | PrintService | fx1234 |

FIG. 13

| USER CLOUD ID | SERVICE NAME | IN-HOUSE USER ID |
|---|---|---|
| tanaka@cloudprint.com | CloudPrint | fx1234 |
| suzuki@cloudprint.com | CloudPrint | fx9999 |
| tanaka@printservice.com | PrintService | fx1234 |
| Any | CloudPrint | fx9999 |
| Any | PrintService | Unknown |

PRINTING MANAGEMENT SYSTEM USING CORRESPONDENCE BETWEEN USER IDENTIFICATION INFORMATION OF AN INFORMATION SYSTEM AND USER IDENTIFICATION INFORMATION OF A PRINTING SYSTEM

CROSS-REFERENCE TO RELATED APPLICATIONS

This application is based on and claims priority under 35 USC 119 from Japanese Patent Application No. 2012-051006 filed Mar. 7, 2012.

BACKGROUND (i) Technical Field

The present invention relates to printing system, management apparatus, management method, image forming apparatus, image forming method, and non-transitory computer readable medium.

(ii) Related Art

Print services have been typically performed in an on-premises model on a unit of organization (such as a company or a school). Since an on-premises print service (server) is a closed system in an organization, a user identification (ID), such as an employee number, unique to the organization may be directly used as a user account. Secure printing and management of print jobs are performed using the user ID unique to the organization.

Cloud print services over the Internet are planned. A user may log in to a cloud print service on a personal computer (PC) using a user ID of the service, and sends print data to the cloud print service after login. The cloud print service provides the print data via the Internet to an image forming apparatus. Printing is thus performed.

Unlike the on-premises service, the cloud print service is shared by multiple organizations and individuals, and assigns user IDs the organizations and individuals independently. The same user ID as the one assigned in an organization is not necessarily granted as a user ID in the cloud print service. The user ID used to identify a user in the cloud print service is typically different from a user ID uniquely assigned in each organization. The cloud print service naturally knows the user ID in the service on print data, but does not know the user ID unique to the organization. When the cloud print service provides the print data to the image forming apparatus for printing, the image forming apparatus has difficulty in providing secure printing and management in accordance with the user ID unique to the organization.

SUMMARY

According to an aspect of the invention, a printing system is provided. The printing system includes at least one image forming apparatus and a management apparatus, each of the image forming apparatus and the management apparatus connected to an information system that performs a first authentication. The management system includes a receiving unit that receives an input of user setting information relating to a user as a registration, the user setting information including first identification information that is user identification information in the information system, second identification information that is user identification information in a print service system that performs a second authentication, and identification information of a logical printer serving as a registration destination of the user, an association relationship registration unit that registers in a predetermined association relationship storage device an association relationship between the first identification information and the second identification information included in the user setting information, and a user setting unit that sets in the print service system the second identification information, included in the user setting information, as identification information of the user who is authorized to use the logical printer corresponding to the identification information of the logical printer included in the user setting information. The image forming apparatus includes a print data retrieval unit that retrieves print data including the second identification information from the logical printer in the print service system, a converter unit that converts the second identification information included in the retrieved print data into the first identification information by referencing the association relationship storage device, and a control unit that controls a process of the retrieved pint data using the first identification information as a conversion result.

BRIEF DESCRIPTION OF THE DRAWINGS

An exemplary embodiment of the present invention will be described in detail based on the following figures, wherein:

FIG. 3 illustrates an example of setting information stored on the cloud print management server;

FIG. 4 illustrates an example of information of joint users sharing each logical printer managed in a cloud print service;

FIG. 5 illustrates an example of a conversion table stored on an image forming apparatus;

FIG. 7 illustrates a modification of the setting information of FIG. 3 that results from adding a joint user of an existing logical printer in response to a setting instruction of another user;

FIG. 10 illustrates a conversion table listing an in-house ID for an unknown account;

FIG. 11 illustrates another conversion table listing an in-house ID for an unknown account;

FIG. 12 illustrates a conversion table for use in multiple cloud print services; and FIG. 13 illustrates a conversion table listing an in-house ID for an unknown account for use in multiple cloud print services.

DETAILED DESCRIPTION

Figure 1:
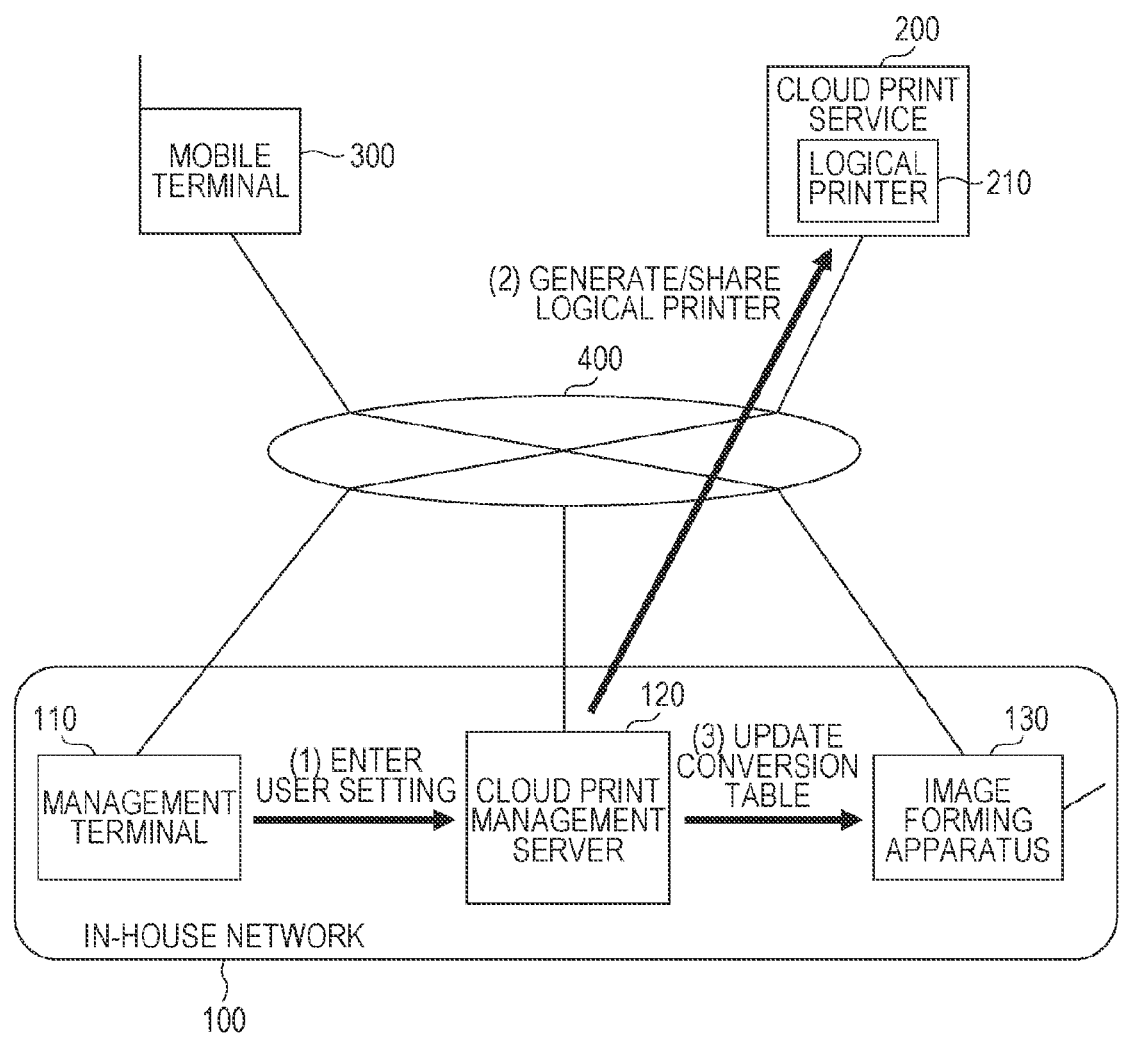
FIG. 1 illustrates a configuration of a system and a user setting process of the system of an exemplary embodiment.

A configuration example of a system of an exemplary embodiment is described below with reference to FIG. 1. The system includes management terminal 110, cloud print management server 120, and image forming apparatus 130, each connected to an in-house network 100 in a company, and cloud print service 200, and mobile terminal 300. The in-house network 100 is a local-area network (LAN), for example. The in-house network 100, the cloud print service 200, and the mobile terminal 300 may be connected to the Internet 400.

The company described herein is an example of an "organization" including multiple users. The management terminal 110, the cloud print management server 120, and the image forming apparatus 130, each connected to the in-house network 100, form an information processing apparatus group, and is an internal information system of the "organization." For example, the internal information system of the organization may further include, in addition to the apparatuses 110 through 130, an aggregating apparatus that calculates aggregate printing charges for each user and each division of the organization of the whole in-house network 100 including multiple image forming apparatuses 130.

The management terminal 110 is an information processing apparatus used by a specific administrator who is in charge of system management relating to at least the use of the cloud print service 200. The management terminal 110 is a personal computer (PC), for example. Using the management terminal 110, the administrator accesses the cloud print management server 120, and performs user setting for use of the cloud print service 200. If the management terminal 110 at least includes a browser, the cloud print management server 120 may provide the management terminal 110 with an input screen for user setting in the form of a web page.

The cloud print management server 120 performs a user setting process for the user to use the cloud print service 200. The cloud print management server 120 is described in detail below with reference to FIG. 2.

The image forming apparatus 130 prints input print data on a paper sheet. The image forming apparatus 130 may have another function in addition to a print function. For example, the image forming apparatus 130 may be a digital multi-function apparatus that has a copy function, a facsimile transmission/receiving function, and an e-mail function in addition to the print function. Although the single image forming apparatus 130 is connected to the in-house network 100 in FIG. 1, plural image forming apparatuses 130 may be connected to the in-house network 100. The image forming apparatus 130 performs a copy process, a scan process, and a print process in response to an instruction provided by the user and received by a user interface (UI) therein. The image forming apparatus 130 also executes the print process in response to an instruction from a computer on the in-house network 100. The image forming apparatus 130 has a function to retrieve the print data from the cloud print service 200 on the Internet 400, and to output the print data for printing.

Each user (individual) belonging to a company is assigned a user ID (hereinafter referred to as an "in-house ID") unique within the company. For example, the in-house ID is an employee number. Information processing apparatuses (such as the image forming apparatus 130, and aggregating apparatus) on the in-house network 100 authenticate and manages users using the in-house IDs. The image forming apparatus 130 has a function to authenticate a user using an in-house ID. The image forming apparatus 130 requires a user of the image forming apparatus 130 to enter authentication information of the user (for example, to enter an in-house ID and a password on a user interface or perform an integrated circuit (IC) card authentication on the user interface). The image forming apparatus 130 performs user authentication in response to the input of the authentication information. The image forming apparatus 130 identifies the in-house ID, includes the identified in-house ID in history (log) information of a process performed, and records the log information on the image forming apparatus 130 or the aggregating apparatus on the in-house network 100. The recorded log information is aggregated by the aggregating apparatus to manage the image forming apparatus 130 in terms of use rate, and to perform billing management. An aggregating operation may be performed on each user or on each division in the company to which the user belongs to, in accordance with the in-house ID recorded on each piece of log information.

The cloud print service 200 is a system that provides a print service to the user on a network such as the Internet. The cloud print service 200 is typically a system including multiple computers. Alternatively, the cloud print service 200 may include one computer only.

The functions typically provided to the user by the cloud print service 200 include a function to convert document data specified by the user (such as document data generated via a word processor or spreadsheet software) into data in a data format suitable for the image forming apparatus 130 (such as portable document format (PDF) or PostScript (registered trademark)), and a function to generate a print job in response to a received print instruction and to manage a print execution state (queue management function). The cloud print service 200 generates and manages a logical printer 210 (also referred to as a printer object) that performs a variety of functions for print service. At least one user who uses the logical printer 210 is registered with the logical printer 210. The cloud print service 200 typically includes multiple logical printers 210. Each logical printer 210 is used by at least one user registered therewith.

At least one physical image forming apparatus 130 that outputs a print job retained in a queue of the logical printer 210 may be registered with the logical printer 210. The logical printer 210 retains a variety of management information of the registered image forming apparatus 130. The management information includes identification information of the image forming apparatus 130 (such as a printer name), and function information about functions of the image forming apparatus 130. The function information includes information as to whether duplex printing is possible, and information as to whether full color printing is possible. If the image forming apparatus 130 includes a post-processing device, the function information includes information about functions of the post-processing device (for example, a stapling function, a punching function, and a folding function).

The user may register (generate) the user's own account on the cloud print service 200. In the account generation, the user registers a unique ID in the cloud print service 200 (hereinafter referred to as an "user cloud ID"). The cloud print service 200 is a public service, and the management of the user ID is independent from the user management of the in-house network 100 for one company only. The user cloud ID is not identical to the in-house ID. Even if a user in the company attempts to register a user ID composed of the same character string as the character string of the in-house ID, the user may not be allowed to register the user ID because the same user ID may have already been registered by another person. The in-house network 100 and the cloud print service 200 (or a larger scale cloud service including the cloud print service 200) perform user authentication and management using mutually different user IDs.

The cloud print service 200 generates a logical printer 210 for a user in response to an instruction from the user. In response to an instruction from a user having the right to register a joint user on an existing logical printer 210, the cloud print service 200 registers the user and the joint user on the logical printer 210. The cloud print service 200 stores a user cloud ID for each user sharing the logical printer 210 on each logical printer 210.

The user logs in to the cloud print service 200 via the Internet 400 with their own user cloud ID in accordance with a communication protocol such as hypertext transfer protocol (HTTP) using the PC or the mobile terminal 300. The user transmits a print instruction to a logical printer 210 (selected from among plural logical printers 210 if the plural logical printers 210 are used) associated with the user cloud ID. The print instruction includes information specifying data to be printed. For example, the print instruction includes document data, or information identifying the document data (for example, information about a storage location of the document data on the Internet 400, such as uniform resource locator (URL)). The logical printer 210 generates and manages a print job in response to the print instruction. The print job is a unit of management for managing the print instruction in the logical printer 210, and has a unique job ID appended thereto. According to the job ID, the logical printer 210 manages information about the document data, page description language data into which the document data are converted, the user cloud ID of the user who has issued the print instruction, and the execution status of the print job (print job unexecuted, print job in progress, print job completed, error and other states).

The logical printer 210 transmits a retained print job to the image forming apparatus 130 specified by the user (in a push operation), and causes the image forming apparatus 130 to print the print job. The logical printer 210 also transmits to the image forming apparatus 130 a print job responsive to a retrieval request from the image forming apparatus 130 (in a pull operation). For example, if the image forming apparatus 130 is present within a firewall, the image forming apparatus 130 may perform a print job in a pull operation by accessing the cloud print service 200 in a protocol such as HTTP, and retrieves the print job.

The mobile terminal 300 may be a portable information terminal such as a notebook type or tablet type PC, a cell phone, or a smart phone. The mobile terminal 300 has a function to connect to the Internet 400. The user logs in to the cloud print service 200 using the mobile terminal 300 and issues a variety of instructions to the cloud print service 200.

The cloud print management server 120 is described in detail with reference to FIGS. 1 and 2.

Figure 2:
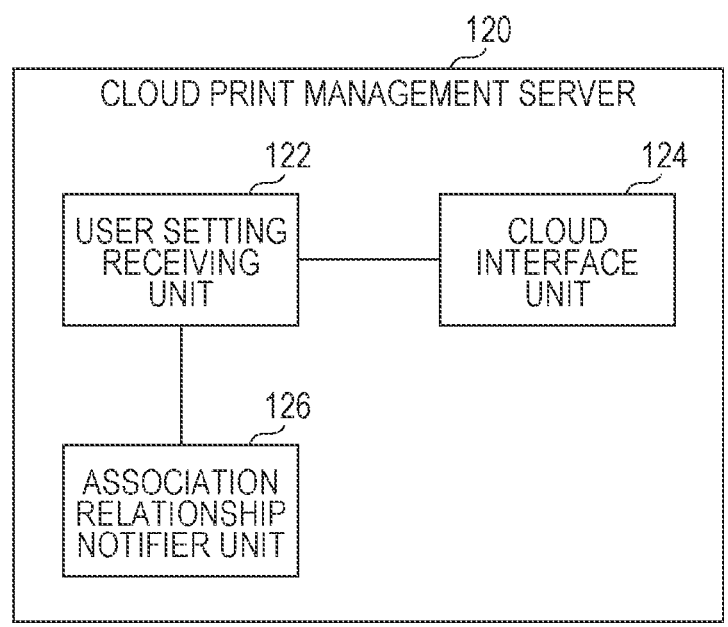
FIG. 2 illustrates a configuration example of a cloud print management server.

The cloud print management server 120 receives from an administrator operating the management terminal 110 a user setting instruction through which the user in the company performs a print operation on the image forming apparatus 130 in the in-house network 100 via the cloud print service 200 (refer to operation (1) in FIG. 1 where the user setting instruction is transmitted). The user setting instruction includes a user in-house ID, the user cloud ID, and identification information of the logical printer 210 used by the user (hereinafter referred to as a logical printer ID). The information may be presented to the administrator by the user, and the administrator inputs the set of these IDs to the cloud print management server 120 using the management terminal 110. The logical printer ID specified herein may be an ID that the cloud print service 200 uniquely assigns the logical printer 210 or a name that the user assigns the logical printer 210 (the name is not necessarily unique in the cloud print service 200). If the logical printer ID is the name assigned by the user, the cloud print management server 120 may manage an association relationship between the logical printer ID assigned by the user and the unique ID assigned to the logical printer by the cloud print service 200, and may convert the logical printer ID specified by the user into the unique ID in the cloud print service 200. Alternatively, the cloud print service 200 may manage the association relationship between the logical printer ID assigned by the user and the unique ID assigned to the logical printer by the cloud print service 200.

The user setting instruction is received by a user setting receiving unit 122 in the cloud print management server 120. In response to the user setting instruction, a cloud interface unit 124 and an association relationship notifier unit 126 execute a setting process to the image forming apparatus 130 in the in-house network 100 and the cloud print service 200.

Using the user cloud ID and the logical printer ID included in the user setting instruction, the cloud interface unit 124 performs the setting process on the cloud print service 200 so that the user uses the logical printer 210 corresponding to the logical printer ID (refer to operation (2) in FIG. 1 where a logical printer is generated and shared). In the setting process, the cloud interface unit 124 determines whether the logical printer 210 having the logical printer ID has been registered in the cloud print service 200. In one operation example, the cloud interface unit 124 performs this determination operation by determining whether the logical printer ID in the user setting instruction is listed in a list (see FIG. 3, for example) of logical printer IDs stored the cloud interface unit 124. In another operation example, the cloud interface unit 124 may query the cloud print service 200 about the registration of the logical printer 210 having the logical printer ID.

If the determination result indicates that the logical printer 210 corresponding to the logical printer ID in the user setting instruction is registered in the cloud print service 200, the cloud interface unit 124 transmits to the cloud print service 200 an instruction to add the cloud ID to a list of joint users of the logical printer 210. If the logical printer 210 is not registered, the cloud interface unit 124 transmits to the cloud print service 200 an instruction to generate a logical printer 210 corresponding to the logical printer ID and an instruction to add the cloud ID to the joint user list of the logical printer 210.

In one operation example, the cloud print management server 120 (or the administrator thereof) has an account (the cloud ID) in the cloud print service 200 in order to issue a variety of instructions to the cloud print service 200. The cloud print management server 120 may log in to the cloud print service 200 using the account of the cloud print management server 120, generate a new logical printer 210 for a user in the company, and register the user as a joint user of the logical printer 210. The cloud print management server 120 may also register a user in the company as a joint user of an existing logical printer 210. The cloud print service 200 has the access right to modify any setting on the logical printer 210 as long as the logical printer 210 is generated by the cloud print service 200. The cloud print service 200 may thus set the joint user using the access right. The user in the company to be set a joint user may simply be granted an access right to input a print instruction (job) to the logical printer 210 and to execute a print job in the logical printer 210 (i.e., to supply the print job to the image forming apparatus 130 for printing). The cloud print management server 120 (the cloud interface unit 124) may set the access right for the joint user on the logical printer 210 in a manner such that a right to set a joint user is excluded from the access right.

The user setting to the cloud print service 200 has been discussed.

The association relationship notifier unit 126 notifies the image forming apparatus 130 in the in-house network 100 of the user cloud ID and the in-house ID included in the user setting instruction. The association relationship notifier unit 126 thus updates a table retained in the image forming apparatus 130 for converting the user cloud ID to the in-house ID (refer to operation (3) in FIG. 1 where a conversion table 142 is updated).

Figure 6:
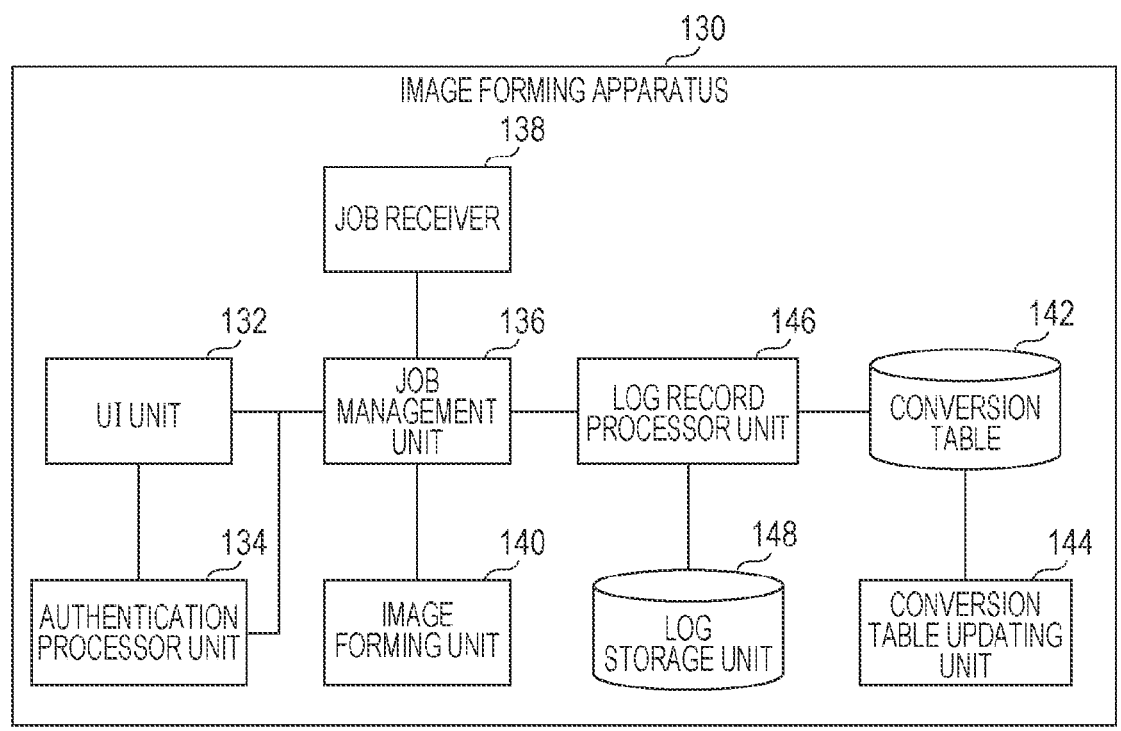
FIG. 6 illustrates an example of a configuration of the image forming apparatus.

The image forming apparatus 130 in the in-house network 100 has the conversion table 142 as illustrated in FIG. 6. The conversion table 142 lists the user cloud ID and the in-house ID for each user. By referencing the conversion table 142, the image forming apparatus 130 converts the user cloud ID to the in-house ID. The image forming apparatus 130 receives a pair of user cloud ID and in-house ID from the association relationship notifier unit 126 in the cloud print management server 120. A conversion table updating unit 144 in the image forming apparatus 130 adds the pair to the conversion table 142, thereby updating the conversion table 142.

As illustrated in FIG. 3, the cloud print management server 120 may store in a table a set of the logical printer ID, the user cloud ID, and the in-house ID included in each user setting instruction received from the management terminal 110. As illustrated in FIG. 3, a first user has cloud ID "tanaka@cloudprint.com," and in-house ID "fx1234" on logical printer "Printer-A." A second user has cloud ID "suzuki@cloudprint.com" and in-house ID "fx9999" on logical printer "Printer-A." The first user and the second user are registered as joint users on logical printer "Printer-A." The first user is also registered as a joint user on logical printer "Printer-B." As illustrated in FIG. 4, the cloud print service 200 retains a portion of the information listed in the table of FIG. 3, i.e., the logical printer ID and the cloud ID, and controls user access to each logical printer in accordance with the logical printer ID and the user cloud ID. As illustrated in FIG. 5, the conversion table 142 retained by the image forming apparatus 130 lists a portion of the information listed in the table of FIG. 3, i.e., the user cloud ID and the in-house ID.

A character string "cloudprint.com" included in the user cloud ID as illustrated in FIG. 3 and other figures is a domain name of the cloud print service 200.

Using the management terminal 110, the administrator may now input to the cloud print management server 120 an instruction to set newly on the logical printer "Printer-A" a third user having a user cloud ID "sato@cloudprint.com," and in-house ID "fx2345" in the system with user information being in the states of FIG. 3 through 5. The system herein includes the cloud print management server 120, the cloud print service 200, and the image forming apparatus 130. The information retained in the cloud print management server 120 is listed in a table of FIG. 7. The user cloud ID "sato@cloudprint.com" is added as a joint user of logical printer "Printer-A" to the cloud print service 200. Added to the conversion table 142 of the image forming apparatus 130 is information indicating that the user cloud ID "sato@cloudprint.com" and in-house ID "fx2345" are associated with each other.

The administrator may now input to the cloud print management server 120 an instruction to set newly on the logical printer "Printer-C" a second user having cloud ID "suzuki@cloudprint.com," and in-house ID "fx9999" in the system with user information being in the states of FIG. 3 through 5. In this case, the cloud print service 200 includes no logical printer corresponding to logical printer ID "Printer-C," and a logical printer is newly generated in response to the instruction from the cloud interface unit 124. The second user having the user cloud ID "suzuki@cloudprint.com" is set as a joint user to the generated logical printer ID "Printer-C." On the other hand, information about the second user is already registered in the conversion table 142 of the image forming apparatus 130 at the state of FIG. 3, and no modification is made on the conversion table 142.

According to the exemplary embodiment, the association relationship between the user cloud ID and the in-house ID is registered on the image forming apparatus 130 if the administrator inputs the user setting instruction using the management terminal 110. The cloud print service 200 is automatically set up so that the logical printer with the user specified thereto is used.

An example of a configuration of the image forming apparatus 130 in the in-house network 100 is described with reference to FIG. 6. The conversion table 142 and the conversion table updating unit 144 out of elements in the image forming apparatus 130 of FIG. 6 are described above, and the other elements are described below.

A user interface (UI) unit 132 in the image forming apparatus 130 receives a local operation input by the user (i.e., a manually input user operation). For example, the user interface unit 132 includes input and display hardware, such as a touchpanel and a mechanical button, and exchanges information with the user via the hardware.

An authentication processor unit 134 in the image forming apparatus 130 authenticates a user who locally uses the image forming apparatus 130. The user authentication is performed using the in-house ID in place of the user cloud ID. An input method of the authentication information to the authentication processor unit 134 may be one of the methods known in the related art. For example, the methods known in the related art include a method of inputting an in-house ID and a password to the user interface unit 132, and a method of authenticating a user through communication with an IC identification card (storing the in-house ID) via an IC card reader mounted on the image forming apparatus 130. If the user is successfully authenticated by the authentication processor unit 134, the in-house ID of the user operating the image forming apparatus 130 is identified. Instead of performing the user authentication, the authentication processor unit 134 may request an authentication server in the in-house network 100 to authenticate the user.

A job management unit 136 in the image forming apparatus 130 generates a job in response to a local process instruction to the image forming apparatus 130 from the user interface unit 132 or a process instruction to the image forming apparatus 130 from a remote apparatus via the network. The job management unit 136 then manages the execution of the job.

Upon being successfully authenticated, the user is able to provide a variety of instructions, including an instruction to copy, and an instruction to scan, using the user interface unit 132. In response to such a process instruction, the job management unit 136 generates a job to manage the process, and performs a job management such as queue management. The job management unit 136 controls the elements of the image forming apparatus 130, thereby executing the job. For example, if a copy instruction is received, a scanner in the image forming apparatus 130 starts up, and reads an original document. An image forming unit 140 prints an image as a result of reading on a paper sheet.

A job receiving unit 138 in the image forming apparatus 130 receives the print data from another apparatus (including the cloud print service 200 on the Internet 400) via the in-house network 100, and the job management unit 136 generates a job corresponding to the print data, and manages the generated job. When it is time to perform that job, the job management unit 136 causes the image forming unit 140 to print the print data of that job on a paper sheet.

In the image forming apparatus 130, a log record processor unit 146 stores on a log storage unit 148 process log information of each job that is executed in accordance with management of the job management unit 136. The log information stored includes information of an in-house ID of a user who has instructed the job to be executed. The log information also includes a variety of items of information typically stored in a process log management of an image forming apparatus, such as execution time and date of the job, print setting information of the print operation (as to whether printing is duplex printing, color printing, or monochrome printing), and the number of prints. The log information of each job stored on the log storage unit 148 is used to calculate a usage amount of the image forming apparatus 130 by each user and each division in the company, and a billing amount for the usage amount. An aggregating apparatus (not illustrated) in the in-house network 100 calculates the aggregation of those amounts. On each piece of the log information stored on the log storage unit 148, the log record processor unit 146 identifies a user or a division of the user, who has executed a job related to the piece of the log information, in accordance with an in-house ID included in the piece of the log information. The log record processor unit 146 adds the usage (or the billing amount responsive to the usage), such as the number of prints in the job, to the aggregate value of usage (aggregate billing amount) for the identified user or the division of the user.

The log storage unit 148 stores the in-house ID of the job as an ID identifying the user having requested the job. By referencing in-house organization information, the log record processor unit 146 sums the aggregate of usage amount (billing amount) for each user or each division.

A local process instruction or a process instruction from another apparatus on the in-house network 100 may include an in-house ID of a requesting user. The log record processor unit 146 may include the in-house ID in the log information before storage.

In contrast, the print data that the logical printer 210 on the cloud print service 200 provides to the image forming apparatus 130 includes the user cloud ID of the user having requested the print data to be printed, but does not include the in-house ID. The cloud print service 200 does not know the in-house ID. The print service 200 manages the user ID (user cloud ID) to manage users thereof, but has generally difficulty in modifying the configuration thereof in a manner such that a user ID in another system, such as each in-house system, is managed.

If the user ID included in a job (print data and the like) is a user cloud ID, the log record processor unit 146 converts the user cloud ID into an in-house ID by referencing the conversion table 142. If a user ID included in the job is not an in-house ID, the log record processor unit 146 compares the user ID with a group of pairs of user cloud IDs and in-house IDs registered in the conversion table 142. If the user ID matches a user cloud ID of any pair, the log record processor unit 146 converts the user cloud ID into the in-house ID paired with the user cloud ID. The log record processor unit 146 includes the in-house ID as the comparison results into the log information, and then stores the log information onto the log storage unit 148.

The log storage unit 148 is included in the image forming apparatus 130 in FIG. 6. Alternatively, the log storage unit 148 may be included in another apparatus (e.g., the aggregating apparatus) in the in-house network 100, and the log record processor unit 146 may write the log information onto the apparatus.

Described above are the user setting process to the cloud print management server 120 and the image forming apparatus 130 via the cloud print management server 120 in the system and the configuration of the cloud print management server 120 and the image forming apparatus 130. A print process using the cloud print service 200 in the system is described below.

Figure 8:
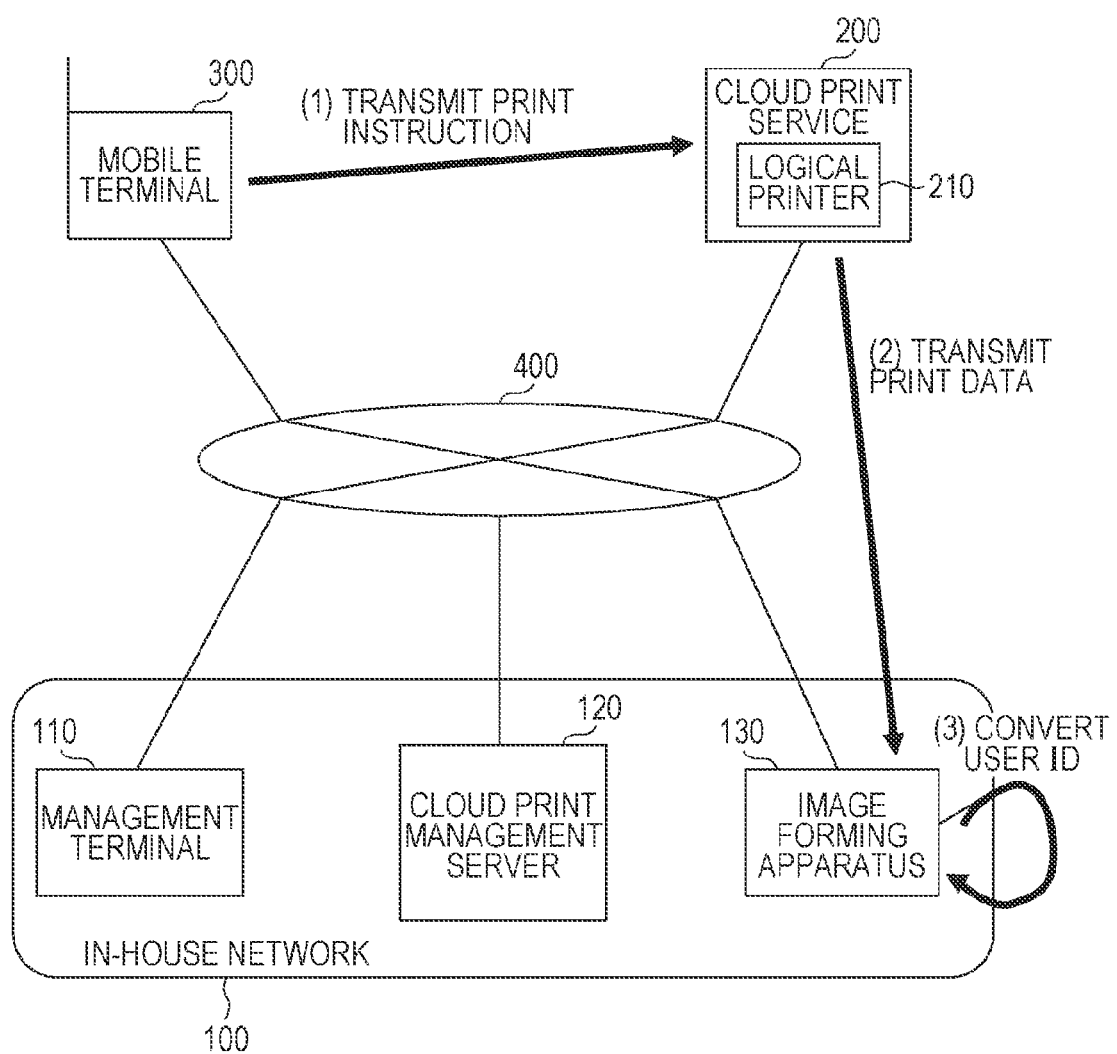
FIG. 8 illustrates a printing process in the system of the exemplary embodiment.

FIG. 8 illustrates a flow of a print process in which a computer on the Internet 400 (for example, the mobile terminal 300 in FIG. 8) provides a print instruction to the cloud print service 200.

In operation (1), a user belonging to the company related to the in-house network 100 logs in to the cloud print service 200 via the Internet 400 in accordance with the user's own cloud ID and password using the mobile terminal 300. The user provides a print instruction to the cloud print service 200. When the user logs in to the cloud print service 200, a list of the logical printers 210 corresponding to the user cloud ID is supplied to the mobile terminal 300. The user may select a logical printer 210 the user may wish to use from the list. The user transmits to the selected logical printer 210 the print instruction including the print data (or information identifying the print data). The print instruction further includes an ID of any image forming apparatus 130 in the in-house network 100 as information identifying a (physical) printer as an output destination.

The logical printer 210 having received the print instruction converts the specified print data into print data in the page description language. In operation (2), the print data are then transmitted to the image forming apparatus 130 specified as a destination. In a setting where the firewall of the in-house network 100 permits the print data to pass from the outside, the logical printer 210 simply transmits the print data to the image forming apparatus 130. In a setting where the firewall does not permit the print data to pass, in one operation example, the logical printer 210 transmits to the image forming apparatus 130 as the destination a message that the print data are ready using a protocol that is permitted to pass through the firewall. The image forming apparatus 130 having received the message accesses the logical printer 210 using a protocol that is permitted to pass through the firewall, such as HTTP, and then retrieves the print data. In another operation example, the image forming apparatus 130 accesses (polls) the logical printer 210 periodically using a protocol such as HTTP. If the print data addressed to the image forming apparatus 130 is present, the image forming apparatus 130 retrieves the print data. The print data transmitted from the logical printer 210 to the image forming apparatus 130 include the user cloud ID of the user who has made the print request. (Alternatively, the cloud ID corresponding to the print data is supplied from the logical printer 210 to the image forming apparatus 130).

Upon receiving the print data from the logical printer 210, the image forming apparatus 130 prints the print data onto a paper sheet. In operation (3), the image forming apparatus 130 converts the user cloud ID included in the print data into the in-house ID by referencing the conversion table 142. In the subsequent job management, the in-house ID as the conversion results is used as a user ID. For example, the log information to be stored as a process log of the job includes the in-house ID as a user ID.

In another operation example, secure printing may be performed using the in-house ID as the conversion results. In the secure printing, the image forming apparatus 130 temporarily stores the received print data on an internal memory rather than immediately printing the print data. The print data to be stored are associated with the in-house ID into which the user cloud ID is converted. When the user having made the print request comes to the image forming apparatus 130 and requests user authentication on the authentication processor unit 134 using the in-house ID, the job management unit 136 prints the print data (job) associated with the in-house ID and stored on the memory.

Figure 9:
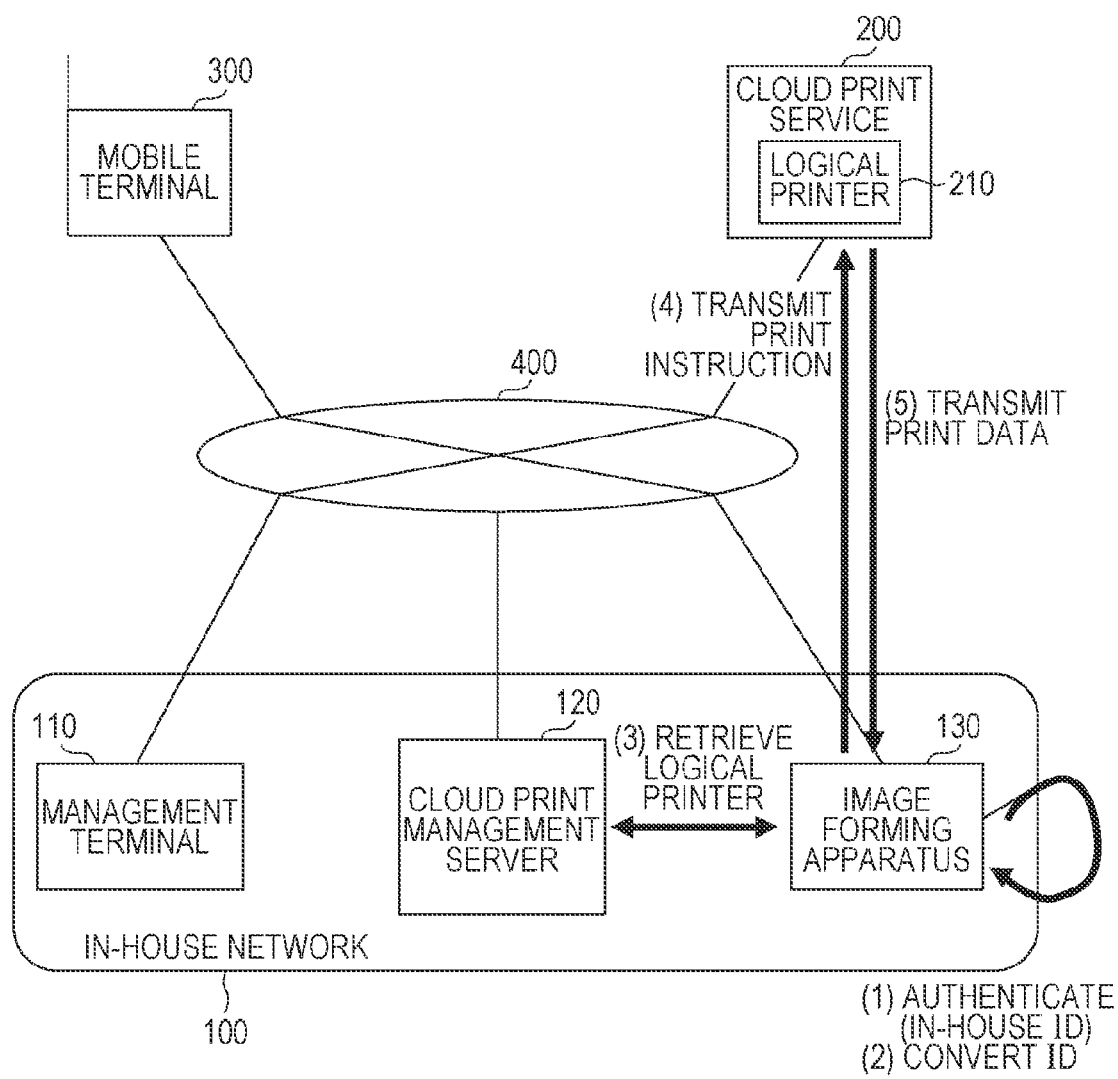
FIG. 9 illustrates another printing process of the system of the exemplary embodiment.

FIG. 9 illustrates a flow of a process in which a user makes a print request to the cloud print service 200 using the image forming apparatus 130 on the in-house network 100. In operation (1), the user logs in to the image forming apparatus 130 through IC card authentication or the like. In operation (2), a controller in the image forming apparatus 130 converts the in-house ID identified through the authentication at the log-in into a user cloud ID by referencing the conversion table 142. In operation (3), a logical printer ID corresponding to the user cloud ID is retrieved from the cloud print management server 120. In operation (3), the cloud print management server 120 searches the management table of the association relationship of the logical printer ID, the cloud ID, and the in-house ID illustrated in FIG. 3 for the logical printer ID corresponding to the user cloud ID presented by the image forming apparatus 130. The cloud print management server 120 then transmits a list of the corresponding logical printer IDs to the image forming apparatus 130. If the user having the in-house ID "fx1234" logs in to the image forming apparatus 130, the cloud print management server 120 transmits to the image forming apparatus 130 logical printer IDs "Printer-A" and "Printer-B."

Instead of operation (3) where the list of logical printers is retrieved from the cloud print management server 120, the image forming apparatus 130 transmits the user cloud ID of the user to the cloud print service 200, and directly retrieves the list of logical printers from the cloud print service 200. If operation (3) is performed, the image forming apparatus 130 retrieves a list of only logical printers that have been set through the cloud print management server 120 (i.e., logical printers for the company). A logical printer for personal use set through a PC at home may be set on the cloud print service 200 in addition to the logical printers for the company set through the cloud print management server 120. Operation (3) reduces the possibility that the image forming apparatus 130 on the in-house network 100 performs a print job of a logical printer for personal use.

In one operation example, the image forming apparatus 130 displays a list of provided logical printer IDs on a display screen of the user interface unit 132. The logical printer ID displayed here may be a unique ID assigned by the cloud print service 200. However, if a logical printer name set by the user in the user setting is used, the logical printer name is easy for the user to remember. The user interface unit 132 receives the logical printer ID selected by the user from the displayed list. In operation (4), the image forming apparatus 130 accesses the cloud print service 200 using a protocol such as HTTP, and logs in to the cloud print service 200 using the user cloud ID. By transmitting the selected logical printer ID to the cloud print service 200, the image forming apparatus 130 transmits a print instruction to the logical printer 210 corresponding to the logical printer ID to print the image data. Upon receiving the print instruction, the cloud print service 200 supplies to the image forming apparatus 130 a list of print jobs retained in a queue of the logical printers 210. The list is displayed on the display screen of the user interface unit 132. The user specifies a print job to be printed out this time from the list. The image forming apparatus 130 transmits a request for the specified print job through HTTP or the like to the logical printer 210. In operation (5), the logical printer 210 transmits to the image forming apparatus 130 the print data of the requested print job in response to the request. The image forming apparatus 130 prints the received print data. The image forming apparatus 130 also manages the print data (job) in association with the in-house ID retrieved in operation (2) in the print process and log storage process.

Instead of asking the user to select a logical printer ID from the list retrieved in operation (3), the image forming apparatus 130 may retrieve a list of print jobs in all the listed logical printers, and may then ask the user to select a print job.

In the process example of FIG. 9, the user selects a print job retained on the specified logical printer 210 and then prints the print data using the image forming apparatus 130. In another process example, using the image forming apparatus 130 the user may instruct the logical printer 210 on the cloud print service 200 to print document data stored on an online storage service or ox (registered trademark)) on the Internet 400. In this case, the image forming apparatus 130 displays a list of available online storages on the display screen of the user interface unit 132, receives information of a selected online storage the user may wish to use, and then accesses the selected online storage. The image forming apparatus 130 receives authentication information of the online storage (user ID or the like) from the user, transmits the authentication information to the online storage, and proceeds to user authentication. If the online storage is accessible with the same user ID (user cloud ID) as the cloud print service 200, the inputting of the user ID may be omitted. Alternatively, the user ID for the online storage may be registered on the conversion table 142. The image forming apparatus 130 determines from the conversion table 142 the user ID for the online storage corresponding to an employee ID identified through user authentication, and then the image forming apparatus 130 logs in to the online storage using the user ID. In this case, if the administrator inputs the user ID for the online storage during the user setting, the user ID may be registered on the conversion table 142 via the cloud print management server 120.

Subsequent to the login, the online storage transmits the list of document data stored by the user back to the image forming apparatus 130. The list is displayed on the display screen of the user interface unit 132, and the user selects a document they desire to print. The image forming apparatus 130 notifies the online storage of the selection results together with information identifying the cloud print service 200 (such as domain name), and information identifying the logical printer 210 selected by the user. Upon receiving the notification, the online storage transmits to the specified logical printer 210 the selected document data (or information, such as URL, identifying the document data) and instructs the logical printer 210 to print the document data. In this way, a job relating to the printing of the document data is registered on the logical printer 210. The job is then supplied to the image forming apparatus 130 in the push operation or the pull operation. The document data are thus printed.

As in related art, the image forming apparatus 130 may display on the display screen the list of document data (the document data which the user has the access right to for printing, and are identifiable by the in-house ID of the user) present on a predetermined server on the in-house network 100 (e.g., a file server). The image forming apparatus 130 may then retrieve and print a document selected from the list. In such a case, the user interface unit 132 displays a menu of process types including "print," and "copy," and if the user selects "print," the user interface unit 132 further receives a user selection between "printing of an in-house document" and "cloud printing." If the printing of the in-house document is selected, the image forming apparatus 130 retrieves and prints document data from an in-house server through the related art function (the ID conversion to the user cloud ID is unnecessary in this case). If the cloud printing is selected, the image forming apparatus 130 retrieves the print data from the cloud print service 200 in accordance with the process flow of FIG. 9, and then prints the print data. In another operation example, the image forming apparatus 130 may retrieve a list of documents of the user from an in-house server using the in-house ID of the user who has logged in. The image forming apparatus 130 may also retrieve a list of print jobs from the cloud print service 200 using the user cloud ID into which the in-house ID is converted. The image forming apparatus 130 may display the two lists in combination, and may then receive a print target selected by the user.

It may happen for any reason that the user cloud ID within the print data transmitted from the cloud print service 200 to the image forming apparatus 130 is not registered on the conversion table 142. To deal with such an unknown account case, the conversion table 142 may include an entry for an unknown account. FIGS. 10 and 11 illustrate examples of the conversion table 142 having entries for unknown accounts. In each example, two of the three entries are formally registered for users, and the lowest row entry in each table is for an unknown account. More specifically, if the user cloud ID of the print data fails to match any of the user cloud IDs of the formally registered entries, a conversion rule at the lowest row entry applies. As illustrated in FIG. 10, an unknown account is converted to an in-house ID "fx9999" of an existing particular user (an administrator, "suzuki@cloudprint.com", for example). As illustrated in FIG. 11, an in-house ID "Unknown" exclusively for an unknown account is prepared. In each case, a billing amount (usage) for the printing of the unknown account is aggregated in terms of the in-house ID corresponding to the unknown account.

The system of the exemplary embodiment may include multiple cloud print services 200. The administrator of the system inputs a user cloud ID for each cloud print service 200 in addition to a logical printer ID and an in-house ID. In response to these pieces of input information, the cloud print management server 120 sets on each cloud print service 200 a user cloud ID for a joint user of a logical printer having a specified logical printer ID (if such a logical printer is not present, the cloud print management server 120 generates the logical printer). The cloud print management server 120 registers an entry of each cloud print service 200 on the conversion table 142 of the image forming apparatus 130. As illustrated in FIG. 12, the conversion table 142 has an item of a service name indicating the cloud print service 200. In the example of FIG. 12, the conversion table 142 lists two cloud print services "CloudPrint" and "PrintService" for the same user (in-house ID "fx1234"). The two cloud print services have respective user cloud IDs registered therefor. The conversion from the user cloud ID to the in-house ID remains the same in the case where the single cloud print service 200 is included.

In the case where the multiple cloud print services 200 are included, an in-house ID corresponding to an unknown account (user cloud ID) may be arranged for aggregation in the conversion table 142. A rule that applies to what in-house ID the unknown account is converted to may be arranged on each cloud print service 200. As illustrated in FIG. 13, an unknown account of the cloud print service "CloudPrint" is converted into the in-house ID "fx9999" of the existing user, and an unknown account of the cloud print service "CloudPrint" is converted into a dedicated in-house ID "Unknown." This method is described for exemplary purposes only. For example, unknown accounts of different cloud print services may be converted into the same in-house ID. An association of account information (user cloud ID) included in the print data with the cloud print service 200 may be identified by a domain name included in the ID.

In the above discussion, the user cloud ID is converted into the in-house ID using the conversion table 142 arranged on the image forming apparatus 130. This method is described for exemplary purposes only. The conversion table 142 may be arranged on a particular server on the in-house network 100 instead of on the image forming apparatus 130. The cloud print management server 120 maintains the conversion table 142 on the particular server in response to a user setting instruction from the administrator of the system. In this case, the cloud print management server 120 may perform the function of the particular server.

An information processing module in each of the cloud print management server 120 and the image forming apparatus 130 (the information processing module performing the functions of the elements of FIG. 6 other than the image forming unit 140) may be implemented when a computer executes a program representing a process of each element of the apparatus. The computer includes, as hardware elements, microprocessor such as a CPU, memories including random-access memory (RAM), and read-only memory (ROM), a hard disk controller controlling a hard disk drive, a variety of input-output interfaces, and network interfaces controlling connection with a network such as a local area network, interconnected via a bus. Connected to the bus via the input-output interface are a disk drive that reads and/or writes a removable disk such as a compact disk (CD) or a digital versatile disk (DVD), and a memory reader-writer that reads and/or writes a removable non-volatile recording medium complying with a variety of standards, such as a flash memory. The program describing the process content of the functional elements is stored onto a fixed storage device such as a hard disk drive via the recording medium such as the CD or the DVD, or via a communication line such as a network, and is thus installed on the computer. The program stored on the fixed recording device is read onto the RAM, and then executed by the microprocessor such as the CPU. The functional elements described above are implemented.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing system comprising at least one image forming apparatus and a management apparatus, each of the image forming apparatus and the management apparatus connected to an information system that performs a first authentication, wherein the management system includes:
a receiving unit configured to receive an input of user setting information relating to a user as a registration, the user setting information including first identification information that is user identification information in the information system, second identification information that is user identification information in a print service system that performs a second authentication, and identification information of a logical printer serving as a registration destination of the user;
an association relationship registration unit configured to register in a predetermined association relationship storage device an association relationship between the first identification information and the second identification information included in the user setting information; and a user setting unit configured to set in the print service system the second identification information, included in the user setting information, as identification information of the user who is authorized to use the logical printer corresponding to the identification information of the logical printer included in the user setting information; and wherein the image forming apparatus includes:

a print data retrieval unit configured to retrieve print data including the second identification information from the logical printer in the print service system;

a converter unit configured to convert the second identification information included in the retrieved print data into the first identification information by referencing the association relationship storage device; and a control unit configured to control a process of the retrieved pint data using the first identification information as a conversion result.

2. The printing system according to claim 1, wherein if the logical printer corresponding to the identification information of the user setting information is not present within the print service system, the user setting unit generates a logical printer corresponding to the identification information within the print service system, and registers onto the print service system the second information, included in the setting information, as identification information of the user who is authorized to use the generated logical printer.

3. The printing system according to claim 1, wherein the management apparatus includes a storage unit configured to store the association relationship between the identification information of the logical printer, and the first or second identification information included in the user setting information received by the receiving unit;

wherein the image forming apparatus includes:

an authentication processing unit configured to receive from the user a user authentication request to authenticate the user in accordance with the first identification information, and then performs user authentication in response to the user authentication request; and a list retrieval unit configured to retrieve from the storage unit in the management apparatus a list of the identification information of the logical printer corresponding to the first identification information of the user authenticated in the user authentication or corresponding to the first identification information into which the converter unit has converted the second identification information; and wherein the print data retrieval unit retrieves the print data from the logical printer corresponding to the identification information within the print service system, using the identification information of the logical printer listed in the list retrieved by the list retrieval unit.

4. The printing system according to claim 2, wherein the management apparatus includes a storage unit that stores the association relationship between the identification information of the logical printer, and the first or second identification information included in the user setting information received by the receiving unit;

wherein the image forming apparatus includes:

an authentication processing unit configured to receive from the user a user authentication request to authenticate the user in accordance with the first identification information, and then performs user authentication in response to the user authentication request; and a list retrieval unit configured to retrieve from the storage unit in the management apparatus a list of the identification information of the logical printer corresponding to the first identification information of the user authenticated in the user authentication or corresponding to the first identification information into which the converter unit has converted the second identification information; and wherein the print data retrieval unit retrieves the print data from the logical printer corresponding to the identification information within the print service system, using the identification information of the logical printer listed in the list retrieved by the list retrieval unit.

5. A management apparatus comprising:

a receiving unit configured to receive an input of user setting information relating to a user as a registration, the user setting information including first identification information that is user identification information in an information system that performs a first authentication and includes an image forming apparatus, second identification information that is user identification information in a print service system that performs a second authentication, and identification information of a logical printer serving as a registration destination of the user;

an association relationship registration unit configured to register in a predetermined association relationship storage device an association relationship between the first identification information and the second identification information included in the user setting information; and a user setting unit configured to set in the print service system the second identification information, included in the user setting information, as identification information of the user who is authorized to use the logical printer corresponding to the identification information of the logical printer included in the user setting information.

6. A management method comprising:

receiving an input of user setting information relating to a user as a registration, the user setting information including first identification information that is user identification information in an information system that performs a first authentication and includes an image forming apparatus, second identification information that is user identification information in a print service system that performs a second authentication, and identification information of a logical printer serving as a registration destination of the user;

registering in a predetermined association relationship storage device an association relationship between the first identification information and the second identification information included in the user setting information; and setting in the print service system the second identification information, included in the user setting information, as identification information of the user who is authorized to use the logical printer corresponding to the identification information of the logical printer included in the user setting information.

7. A non-transitory computer readable medium storing a program causing a computer to execute a management process, the management process comprising:

receiving an input of user setting information relating to a user as a registration, the user setting information including first identification information that is user identification information in an information system that performs a first authentication and includes an image forming apparatus, second identification information that is user identification information in a print service system that performs a second authentication, and identification information of a logical printer serving as a registration destination of the user;

registering in a predetermined association relationship storage device an association relationship between the first identification information and the second identification information included in the user setting information; and setting in the print service system the second identification information, included in the user setting information, as identification information of the user who is authorized to use the logical printer corresponding to the identification information of the logical printer included in the user setting information.

8. An image forming apparatus comprising:
a print data retrieval unit configured to retrieve, from a logical printer within a print service system that performs a second authentication, print data including second identification information that is user identification information in the print service system;
a converter unit configured to convert into first identification information the second identification information included in the print data retrieved by the print data retrieval unit, by referencing an association relationship storage device that stores an association relationship between the second information and the first identification information that is user identification information in an information system that performs a first authentication and includes the image forming apparatus; and
a control unit configured to control a process that the image forming apparatus performs on the retrieved pint data, using the first identification information as a conversion result.

9. An image forming method comprising:
retrieving, from a logical printer within a print service system that performs a second authentication, print data including second identification information that is user identification information in the print service system;
converting into first identification information the second identification information included in the retrieved print data, by referencing an association relationship storage device that stores an association relationship between the second information and the first identification information that is user identification information in an information system that performs a first authentication and includes an image forming apparatus; and
controlling a process that the image forming apparatus performs on the retrieved pint data, using the first identification information as a conversion result.

10. A non-transitory computer readable medium storing a program causing a computer to execute a process for forming an image, the process comprising:
retrieving, from a logical printer within a print service system that performs a second authentication, print data including second identification information that is user identification information in the print service system;
converting into first identification information the second identification information included in the retrieved print data, by referencing an association relationship storage device that stores an association relationship between the second information and the first identification information that is user identification information in an information system that performs a first authentication and includes an image forming apparatus; and
controlling a process that the image forming apparatus performs on the retrieved pint data, using the first identification information as a conversion result.

* * * * *